April 2, 1963 D. B. PALL 3,083,834
FILTER UNIT
Filed Sept. 1, 1959 3 Sheets-Sheet 1

INVENTOR.
DAVID B. PALL
BY
ATTORNEYS.

April 2, 1963     D. B. PALL     3,083,834
FILTER UNIT

Filed Sept. 1, 1959     3 Sheets-Sheet 3

INVENTOR.
DAVID B. PALL

ATTORNEYS.

ized Apr. 2, 1963

3,083,834
FILTER UNIT
David B. Pall, Roslyn Heights, N.Y., assignor to Pall Corporation, Glen Cove, N.Y., a corporation of New York
Filed Sept. 1, 1959, Ser. No. 837,477
6 Claims. (Cl. 210—299)

This invention relates to a filter unit and filter assembly which are particularly designed to combine small size particle removal with high dirt capacity, freedom from media migration, and a high degree of reliability.

In equipment for use in the filling of aircraft missile hydraulic reservoirs, a filter unit is required which is capable of removing particles as small as 3 microns in diameter. It is also desirable that the filter unit have a high dirt capacity, so that it can be used for long periods without having to be taken down for cleaning. The filter element in order to provide a high dirt capacity should be of the depth or fibrous layer type, but since operational pressure range up to 4500 p.s.i. with the possibility of high differential pressures across the element, this imposes severe requirements on the unit, and extraordinary measures have to be taken to prevent migration of fibers from the element.

The filter unit of the invention is capable of accomplishing this, and does so using three stages of filtration. The first two stages together constitute the filter assembly of the invention.

In the first stage, a depth type of filter medium is employed. This is in the form of a layer or bat of fine fibers, such as quartz or glass fibers or fibers of synthetic polymeric material. The fibers are preferably of a low bulk density, of the order of from 2 to 5 pounds per cubic foot, and less than 5 microns in diameter. An appropriate range of fiber diameters is from about 0.3 to about 3 microns, with the average approximately 0.75 micron. Such a material when formed in a layer ⅛ inch thick and subjected to a flow of hydraulic fluid MIL-H-5606 at 8 gallons per minute per square foot, will collect approximately 80 g. per square foot or more of carbonyl iron E before a pressure drop of 100 p.s.i. is reached. Under these conditions, no particles larger in diameter than 3 microns pass the filter element.

Such a fibrous filter element has an extremely high dirt capacity. However, its principal disadvantage is that it is not strong enough mechanically to withstand the destructive force of the fluid flow, and the fibers will in time be dislodged by the fluid and carried off, resulting in a filtrate which carries a high load of fibers and, eventually, destruction of the element. Such destruction is prevented in the filter assembly of the invention by a second stage filter element, in the form of a microporous membrane of natural or synthetic polymeric material. This membrane should have an absolute removal rating of particles having a diameter of the order of 3 microns or less, to meet the need. Such a membrane will prevent passage of fibers from the first stage filter element.

A number of microporous membranes made of a variety of polymeric materials are available and can be employed. Particularly desirable are those made from cellulose nitrate, as described in U.S. Patent No. 1,421,341 to Zsigmondy and Bachmann. Also useful are microporous nylon films cast from an alcohol water solution according to U.S. Patent No. 2,783,894 to Lovell et al., microporous films of polyvinyl chloride prepared in accordance with U.S Patent No. 2,864,777 to Preston Robinson, and cloth coated and impregnated with cellulose acetate or cellulose nitrate, as described in U.S. Patents Nos. 1,693,890 and 1,720,670 to Duclaux. Such membranes range, for example, from about 0.001 to about 0.1 inch in thickness.

The first and second stage filter elements cooperate to prevent passage of particles of a diameter greater than approximately 3 microns. Microporous membranes occasionally have large apertures which would if used alone permit particles of from 10 to 15 microns in diameter, for example, to pass through. Such particles are normally removed by the first stage fibrous filter element of the assembly of the invention. Such an aperture would theoretically permit the passage of some fibers from the first stage element, but in practice the number of fibers passed due to such a fault cannot be measured.

The first stage fibrous filter element considerably improves the utility of the microporous membrane filter by increasing its dirt capacity. A test of the two stages in combination, using MIL-H-5606 hydraulic fluid, shows that the total pressure drop across these filters is distributed fairly evenly between them. When sufficient hydraulic fluid has been passed so that the contaminants collected raise the pressure drop up to a total of 100 p.s.i. differential pressure, for example, from 50 to 80 p.s.i. of this is noted across the fibrous filter element, and the balance of from 20 to 50 p.s.i. across the membrane filter element. The combination gives a higher maximum dirt capacity for the system than the sum of that for either alone.

It will, of course, be understood that the coarseness or fineness of the first stage filter element and the porosity of the microporous filter membrane will be selected to meet the requirements. Coarse fibrous materials and less porous membrane materials lower the dirt capacity of the filter assembly. The characteristics of the first and second stage filter elements therefore can be varied according to the requirements, and the dimensions given above will be varied accordingly. They meet a definite need in making possible a high dirt capacity combined with reliable filtration of all particles up to 3 microns in diameter.

The microporous membrane has the advantage of good absolute particle size control coupled with a relatively low pressure drop. However, it is mechanically quite weak, incapable of withstanding relatively high differential pressures. Accordingly, in the filter assembly of the invention, it is supported against a paper filter element, and this in turn is held on a plastic spacing element which is apertured to provide for flow of filtered fluid from the assembly to the next filter stage.

The paper filter element can be made of any of the fibrous materials widely used for this purpose, such as regenerated cellulose, cellulose polymers, such as polyvinyl chloride, nylon, Dacron, polyacrylonitrile, and polyvinylidene chloride. Although capable of filtering out suspended particles, it acts largely as a mechanical support in this assembly, and does not in fact contribute to filtration, because the first and second stage filters in combination remove even small suspended particles that actually would pass through the paper element. However, the paper filter element does function as an emergency filter in the event of a tear or other fault appearing in the membrane or fibrous layers in use.

The third stage filter which receives the flow from the foregoing filter assembly is a wire mesh filter, which can be of the bonded type, such, for example, as is disclosed in U.S. Patent No. 2,925,650, dated February 23, 1960. Such an element can be made to withstand high differential pressures, up to, for example, 4500 p.s.i., when reinforced by sinter bonding, by use of multiple layers, as disclosed in the patent, and with a proper internal support core. In normal operation, this element is formed with a pore opening of a size larger than that of the second stage microporous polymeric membrane, ranging, for example, from 10 to 25 microns, preferably from 13.5 to 18 microns maximum. This element performs the function of removing any fibers which happen to become detached from the cellulosic paper element, or which may by chance pass through the foregoing filter assembly. Because the major proportion of the suspended matter is removed in the first two stages, this element will operate indefinitely, so long as the filter assembly is operating properly.

In the event that the filter assembly is permitted to load up past its rated differential pressure, normally 100 p.s.i. so that collapse occurs, or if for any other reason the foregoing filter assembly is damaged, the third stage element prevents passage of all particles larger than its maximum pore diameter, and will also provide a very high removal rating of smaller particles because of the nature of this element. 98% removal of particles of approximately 5 microns in diameter and larger is obtainable, using an element of this type whose weave is such as to provide a normal opening of 13.5 microns and a maximum opening of 18 microns. Such a third stage unit holds back nearly all of the fibers from the foregoing filter assembly, and still provides a high degree of reserve filtration.

It will, of course, be understood that while the filter elements described in U.S. Patent No. 2,925,650 dated February 23, 1960 are preferred for use in the third stage, because of their exceptional filter capacity and strength, other wire mesh filters could be employed, such as, for example, are disclosed in the Behlen Patent No. 2,423,547.

Figure 1:
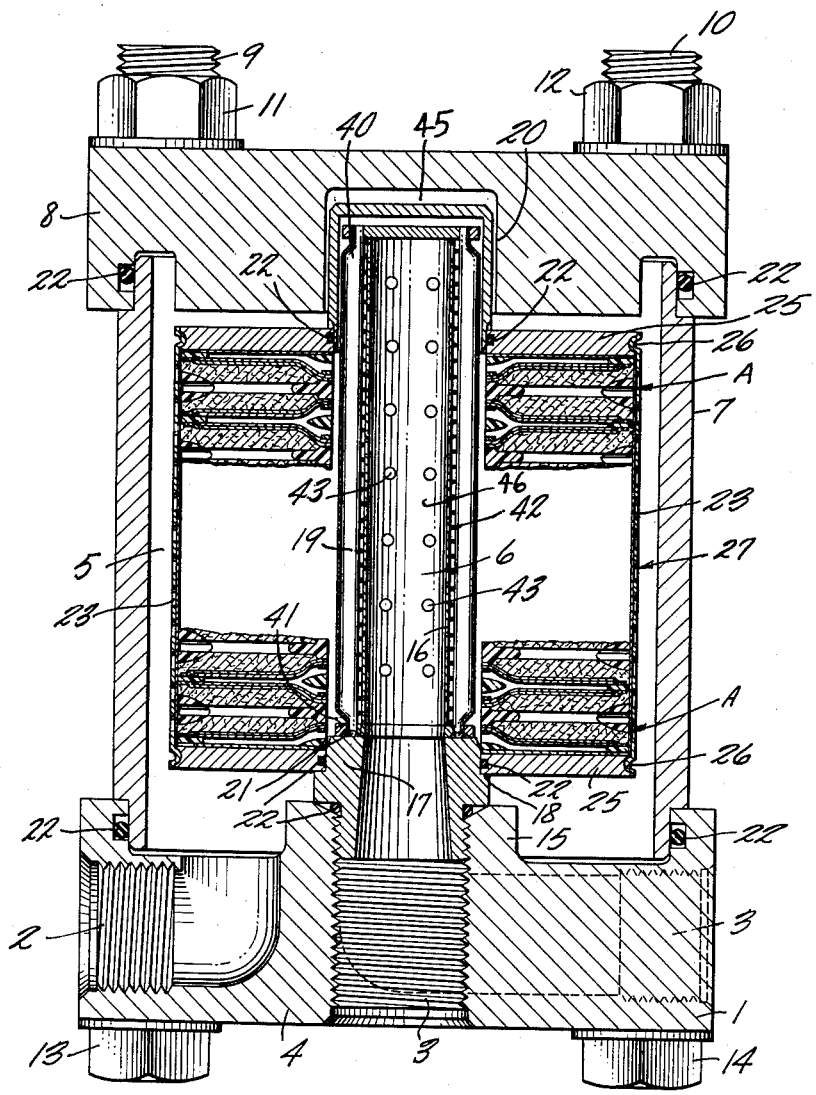
FIGURE 1 is a cross-sectional view of a complete filter unit in accordance with the invention.

The filter unit of FIGURE 1 comprises a lower end plate 1 provided with an inlet passage 2, and an outlet passage 3 which may exit at the side of the device, as shown, or at the bottom 4 of the end plate. Inlet 2 opens into the outer of two concentric chambers 5 and 6 in the filter tube 7, the other end of which is closed by the upper end plate 8. The filter tube 7 is held tightly between the plates 1 and 8 by tie bolts 9 and 10 on the ends of which are threaded nuts 11, 12, 13 and 14. Tie rods also could be used.

Top plate 1 has an upwardly projecting apertured central portion 15, enclosing a central passage 16 which opens into chamber 6 and the outlet passage 3. Fitted into 15 at the end of the passage 16 is a tube 17, on a ledge 18 formed in the outer wall of which are seated a plurality of filter assemblies A in accordance with the invention, shown in detail in FIGURE 2. A third stage filter element 19 of sintered woven wire mesh abuts at its lower end against the top face of the tube 17, and its upper end fits into a re-entrant portion 20 in the upper end plate 8. The third stage element is securely attached to the end of the tube as by welding, such as is shown in the drawing. O-ring seals 22 are provided between the end plate and the filter tube, preventing leakage, and the other end is sealed off with O ring 22 and the closure cap 45.

Figure 2:
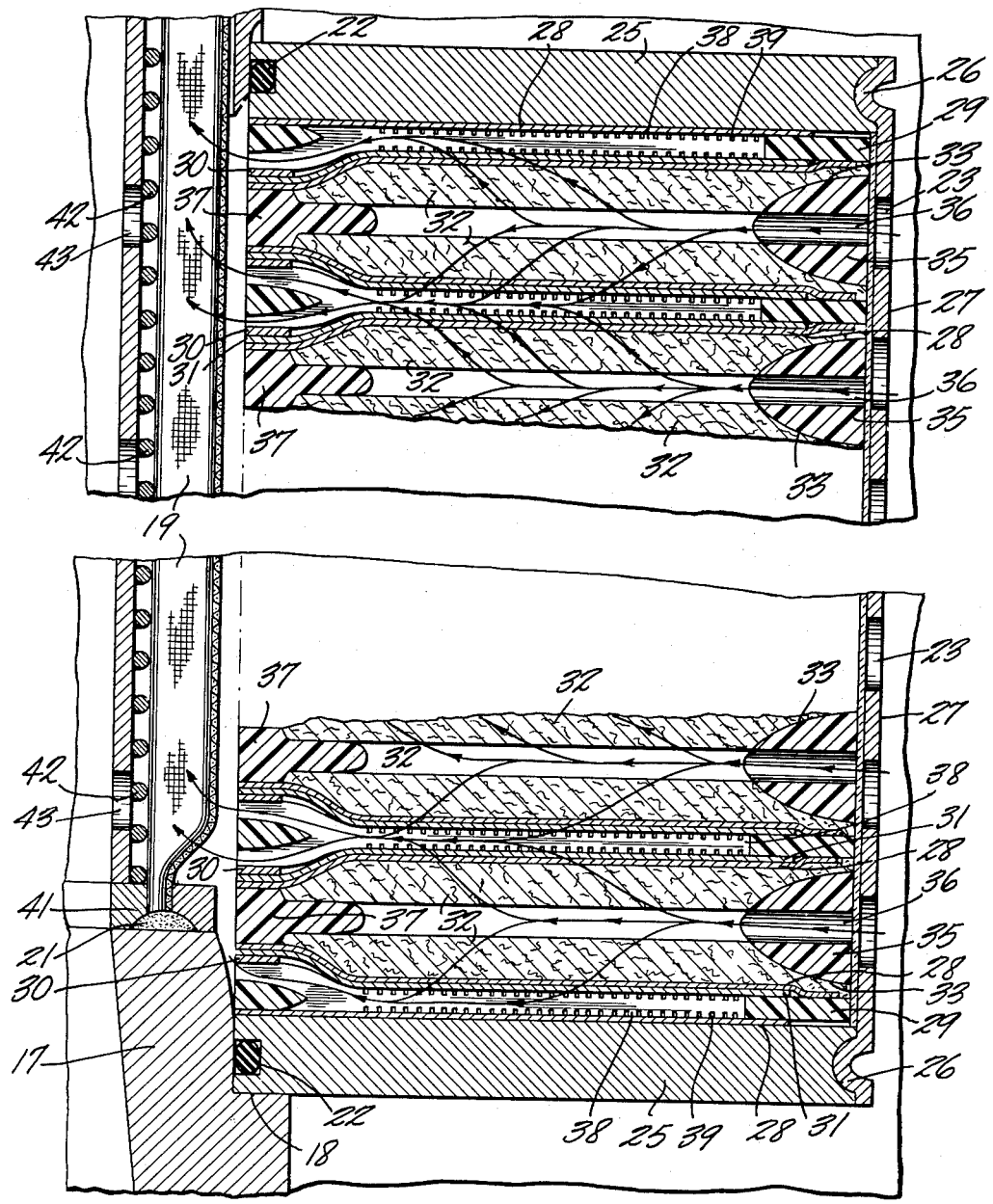
FIGURE 2 is a detailed view of the portion A of FIGURE 1, and shows a complete filter assembly, a plurality of which are employed in the filter unit of FIGURE 1.

Two adjacent typical filter assemblies A in accordance with the invention, are shown in FIGURE 2. All of the components of the assemblies are apertured to receive the third stage filter element 19, and are enclosed by two cover plates 25, the outer peripheries of which are indented to receive the crimped end 26 of a perforated canister 27 of suitable material such as stainless steel or aluminum or synthetic resin, such as cellulose acetate, polyethylene or phenol-formaldehyde resin. The inner apertures of the cover plates are flush with the filter element 19. Within the canister 27, in sequence, proceeding upwardly as shown in the drawing from the cover plate 25, is a microporous membrane 28 of polymeric material such as cellulose nitrate, and then follow a plurality of filter assemblies A composed of (1) an outlet spacer 29, (2) a support ring 30, made of plastic or metal such as aluminum, (3) a filter paper 31 such as cellulose, nylon or Dacron, (4) a microporous membrane 28 of cellulose nitrate, (5) a depth type fibrous filter element 32 of quartz fibers below 5 microns in diameter, and (6) an inlet spacer 33. These constitute all of the elements of a complete filter assembly. For most efficient use of inlet spacers, which are double-faced, it is convenient to arrange the next filter assembly in reverse order. First is the spacer 33, then a depth type quartz fiber filter element 32, a microporous membrane filter 28 of cellulose nitrate, a cellulose filter element 31, an aluminum sealing ring 30, and an outlet spacer 29. The first sequence then is repeated in the next assembly, and so on, to the capacity of the canister, in this case, eleven.

The canister is finished off with a membrane between the last outlet spacer and the end cap.

Figure 3:
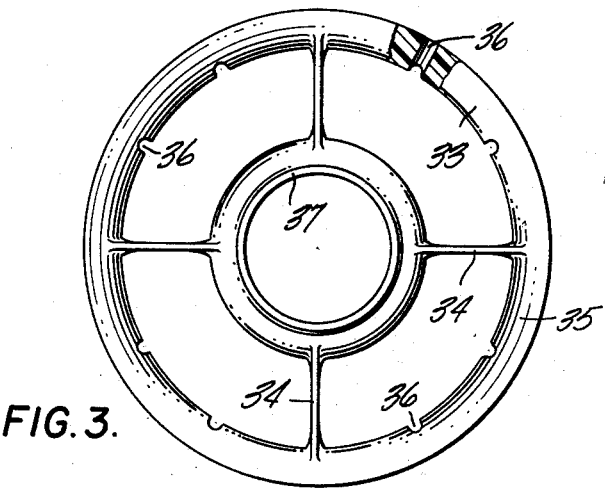
FIGURE 3 is a top view of an inlet spacer of the filter assembly of FIGURE 2.
Figure 4:
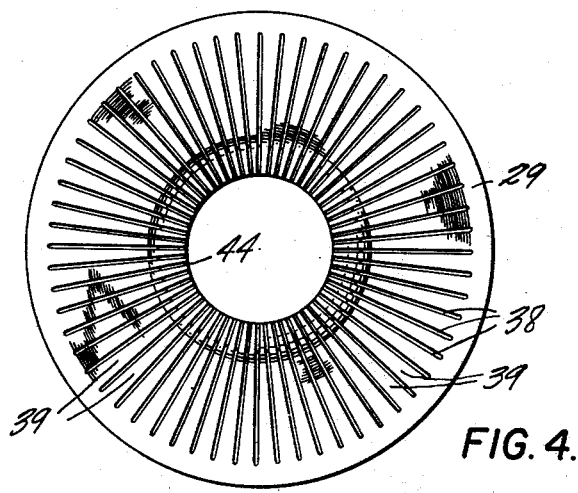
FIGURE 4 is a top view of an outlet spacer employed in the filter assembly of FIGURE 2.
Figure 5:
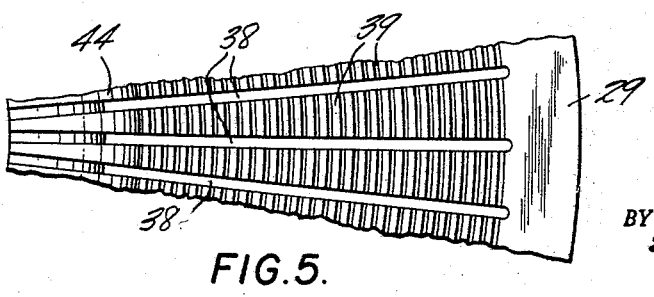
FIGURE 5 is a top view of the hub portion of the outlet spacer shown in FIGURE 4.

Details of the inlet and outlet spacing elements are best seen in FIGURES 3, 4 and 5.

The inlet spacer is in the form of a double-faced ring with a minimum of spokes 34 as required for structural support, and a rim 35 of substantial thickness. The rim is provided with a plurality of radial passages 36 per segment for passage of fluid to be filtered into the central portion of the ring. The hub 37 of the ring is raised to a level above the central portion of the adjacent fibrous filter elements, and provides for a seal with the ring 30.

The outlet spacer 29 is a double-faced ring, desirably of molded thermoplastic or thermosetting resin such as polystyrene or cellulose acetate butyrate or phenol-formaldehyde resin having a plurality of radial slots 38 spaced by a corresponding number of ribs or spokes 39 which are grooved concentrically. The central portion of one side of the spacer has a raised hub portion 44 grooved radial corresponding to the slots 38. The spacers that abut the membranes adjacent the cover plates are flat on the side facing the membrane, but otherwise are identical with the others.

It will be seen from FIGURE 2 that the flow of fluid through a given assembly A is through the passages 36 in the rim of the inlet spacer 33 into the space between the spokes thereof, and between adjacent fibrous filter elements, thence through this element, the microporous membrane filter and the cellulose filter into the slots 38 of the outlet spacer 29, and thence along the grooved portion of the hub to the outside of the filter element 19.

It will be seen from FIGURE 1 that the third stage filter element 19 is centrally disposed within the composite filter assemblies. This filter element is in the form of a woven sintered stainless steel wire mesh, formed into relatively deep corrugations approximately 0.160 inch in depth, running axially of the unit, and taking the generally cylindrical or tubular form shown. The upper and lower ends 40 and 41 of the filter element 19 are symmetrically compressed, as by crimping, and each end is fitted between outer and inner rings, the three being joined by a weld. The central portion of the element is strengthened by the perforated support core 46 which has a plurality of perforations 43 therethrough for passage of fluid from the filter element 19 into the passage 6.

In operation, the fluid to be filtered enters the filter unit at 2 and passes into the outer chamber 5 of the filter bowl. Thence, the fluid enters the canister 27 through the perforations 23, and through one of the filter assemblies enclosed by the canister, whence it proceeds radially through the filter element 19 and perforations 43 in the support core 46 into the central passages 6 and 16, and finally emerges at the outlet 3.

Filter units in accordance with the invention are especially designed for use in filtering fluid used in aircraft and missile hydraulic reservoirs, but it will be apparent that they have general utility in filtration of fluids where extremely small particles have to be removed under conditions requiring reliability, high dirt capacity, and freedom from media migration.

I claim:

1. A filter unit comprising, in combination, an enclosure having openings therethrough for entry and exit of fluid, and, disposed within said enclosure, a filter assembly comprising an inlet spacing element for passage of fluid to be filtered entering said assembly, an outlet spacing element coextensive with the inlet spacing element for exit of filtered fluid from the assembly, and supported by the spacing elements and disposed therebetween, across the flow of fluid from the inlet spacer to the outlet spacer in sequence in the direction of fluid flow, a relatively thick low bulk density high dirt capacity fibrous layer, a microporous membrane filter element of polymeric material in contact therewith, and a paper filter element in contact with the membrane filter element.

2. A filter unit in accordance with claim 1 in which the fibrous layer is composed of fibers having a diameter within the range from about 0.3 to about 3 microns.

3. A filter unit in accordance with claim 1 comprising, in combination, a low bulk density high dirt capacity fibrous layer and a microporous membrane filter element of polymeric material together having an effective pore diameter not exceeding 3 microns.

4. A filter unit in accordance with claim 1 which includes a plurality of filter assemblies as therein defined.

5. A filter unit in accordance with claim 1 in which said filter assembly has a central aperture, and a tubular wire mesh filter element disposed in the central aperture so that the inside of the wire mesh filter element opens into the opening for the exit of fluid.

6. A filter unit in accordance with claim 1 in which the inlet spacing element has a rim portion apertured radially and enclosing an open portion for the passage of the fluid into the open portion, and the outlet spacing element has a plurality of radial openings therethrough and a central raised portion, grooved radially to correspond to the apertures opening into an open central portion for exit of filtered fluid therefrom.

References Cited in the file of this patent

UNITED STATES PATENTS

| | | |
|---|---|---|
| 956,832 | Seitz | May 3, 1910 |
| 1,331,732 | Wait | Feb. 24, 1920 |
| 1,693,890 | Duclaux | Dec. 4, 1928 |
| 2,154,565 | Fife | Apr. 18, 1939 |
| 2,353,760 | Richards | July 18, 1944 |
| 2,454,030 | Besore | Nov. 16, 1948 |
| 2,540,152 | Weller | Feb. 6, 1951 |
| 2,596,392 | Fessler | May 13, 1952 |
| 2,615,574 | Kracklauer | Oct. 28, 1952 |
| 2,631,732 | Vocelka | Mar. 17, 1953 |
| 2,639,036 | Humbler et al. | May 19, 1953 |
| 2,640,789 | Hausner | June 2, 1953 |
| 2,654,483 | Ahlijian | Oct. 6, 1953 |
| 2,675,920 | Muller | Apr. 20, 1954 |
| 2,720,983 | Kracklauer | Oct. 18, 1955 |
| 2,731,152 | Redner | Jan. 17, 1956 |
| 2,925,650 | Pall | Feb. 23, 1960 |
| 3,003,643 | Thomas | Oct. 10, 1961 |